US006809739B2

(12) United States Patent
Farinelli et al.

(10) Patent No.: US 6,809,739 B2
(45) Date of Patent: Oct. 26, 2004

(54) SYSTEM, METHOD, AND COMPUTER PROGRAM PRODUCT FOR BLENDING TEXTURES DURING RENDERING OF A COMPUTER GENERATED IMAGE USING A SINGLE TEXTURE AS A MASK

(75) Inventors: Paolo Farinelli, Sunnyvale, CA (US); Angus M. Dorbie, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 91 days.

(21) Appl. No.: 10/183,553

(22) Filed: Jun. 28, 2002

(65) Prior Publication Data

US 2003/0201995 A1 Oct. 30, 2003

Related U.S. Application Data

(60) Provisional application No. 60/376,223, filed on Apr. 30, 2002.

(51) Int. Cl.[7] .................................................. G09G 5/00
(52) U.S. Cl. ........................ 345/582; 345/583; 345/584; 345/587; 345/588
(58) Field of Search ................................. 345/582–588

(56) References Cited

U.S. PATENT DOCUMENTS

| | | | | |
|---|---|---|---|---|
| 6,108,007 A | * | 8/2000 | Shochet ...................... 345/586 |
| 6,115,049 A | * | 9/2000 | Winner et al. ............... 345/611 |
| 6,157,386 A | * | 12/2000 | Wilde .......................... 345/587 |
| 6,259,462 B1 | * | 7/2001 | Gruber et al. ............... 345/561 |
| 6,333,744 B1 | * | 12/2001 | Kirk et al. ................... 345/506 |
| 6,356,273 B1 | * | 3/2002 | Posniewski et al. ........ 345/587 |
| 6,373,482 B1 | | 4/2002 | Migdel et al. |
| 6,392,655 B1 | * | 5/2002 | Migdal et al. ............... 345/582 |
| 6,486,887 B1 | * | 11/2002 | Lewis ......................... 345/587 |
| 6,707,458 B1 | * | 3/2004 | Leather et al. .............. 345/582 |

* cited by examiner

Primary Examiner—Matthew C. Bella
Assistant Examiner—Po-Wei Chen
(74) Attorney, Agent, or Firm—Sterne, Kessler, Goldstein & Fox P.L.L.C.

(57) ABSTRACT

A variable number of textures are blended together using a single texture as a mask. At least four textures are received. Masks are extracted from one of the received textures and used to blend together the remaining textures. In an embodiment, N masks are extracted from a single texture and used to blend N+1 additional textures. In this embodiment, two of the N+1 textures are initially blended together in accordance with one of the N masks to form an image. Another texture of the N+1 textures is then blended with the image in accordance with another one of the N masks. This iterative blending process continues until all of the N+1 textures have been blended together. In another embodiment, N textures are blended together by multiplying each of the N textures by one of the N masks and adding together the results of the N multiplications.

16 Claims, 15 Drawing Sheets

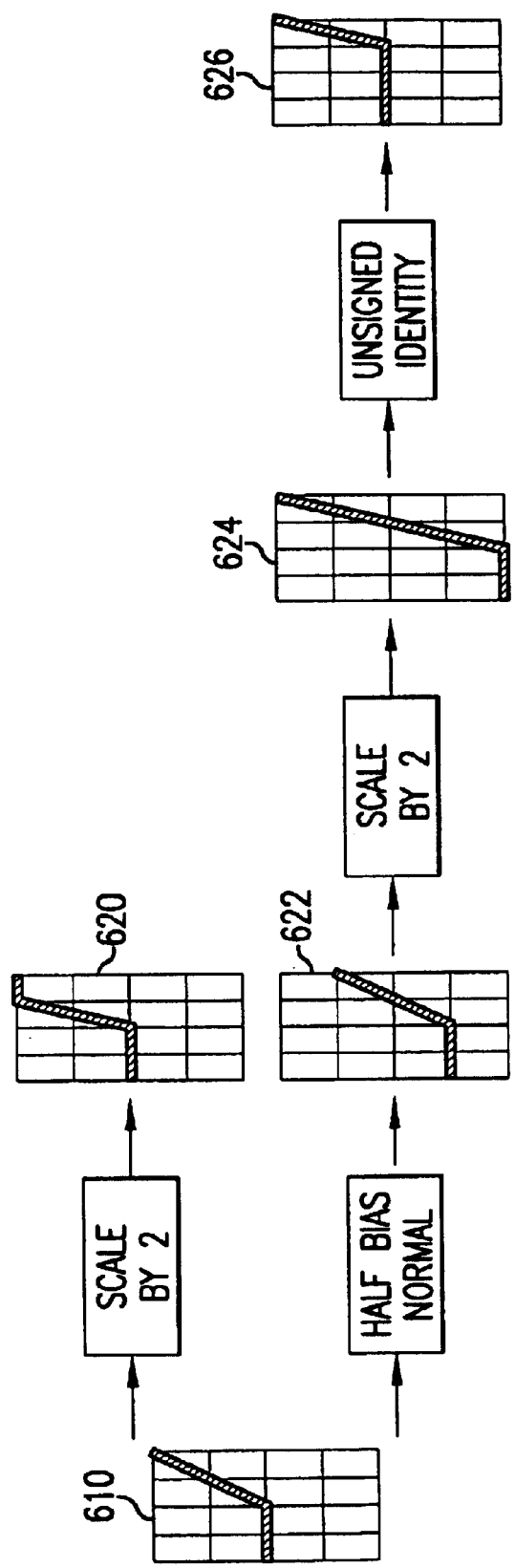

US 6,809,739 B2

SYSTEM, METHOD, AND COMPUTER PROGRAM PRODUCT FOR BLENDING TEXTURES DURING RENDERING OF A COMPUTER GENERATED IMAGE USING A SINGLE TEXTURE AS A MASK

CROSS REFERENCE TO RELATED APPLICATIONS

This application claims the benefit of U.S. Provisional Application No. 60/376,223, filed Apr. 30, 2002, which is incorporated herein by reference in its entirety.

FIELD OF THE INVENTION

The invention relates to computer graphics. More particularly, it relates to rendering of a computer generated image.

BACKGROUND OF THE INVENTION

Computer systems are used to render all kinds of images for display. In general, it is important that images rendered for display appear as realistic to a viewer as possible. It is also important in many applications that the computer system used to render images for display operate at an interactive rate.

Many computer systems used to render images for display have graphics processors such as the NVIDIA GEFORCE3 graphics processor, available from NVIDIA Corporation, Santa Clara, Calif., and the ATI RADEON 8500 graphics processor, available from ATI Technologies, Incorporated, Canada. These graphics processors support multiple texture units. These graphics processors also allow for flexibility in the configuration of the per-pixel computation stage of their graphics rendering pipeline. This makes it possible to implement, at interactive rates, complex algorithms for combining, blending, and/or modulating multiple textures in a single pass through the graphics rendering pipeline.

One technique for combining or blending two textures involves using a fragment value from one texture as a weight in the blending of fragment values from two other textures. While this technique is useful in many instances, it has limitations. For example, it cannot be used to blend three or more textures in a single pass through a graphics rendering pipeline. It also cannot blend three or more textures using a single texture as a mask. U.S. Pat. No. 6,373,482 to Migdel et al., issued Apr. 16, 2002, describes a technique for modifying the blending between two clip-map tiles (i.e., textures). This technique also has limitations such as, for example, it cannot blend three or more clip-map tiles using a single texture as a mask.

What is needed are new techniques for combining, blending, and/or modulating more than two textures at an interactive rate, which can be implemented in a single pass through a graphics rendering pipeline.

BRIEF SUMMARY OF THE INVENTION

The present invention provides a method, a system, and a computer program product for blending a variable number of textures using a single texture as a mask. At least a first texture, a second texture, a third texture, and a fourth texture are used to form a blended image. Masks are extracted from one of the textures. The other textures are blended together in accordance with the extracted masks to form the blended image.

In one embodiment of the invention, N−2 masks are extracted from the first texture of N textures, wherein N is a number equal to at least four. The second texture and the third texture of the N textures are blended in accordance with one of the N−2 masks to form the blended image. Another texture of the N textures is blended with the blended image in accordance with another one of the N−2 masks. In a similar manner, other textures of the N textures are blended with the blended image in accordance with other ones of the N−2 masks until all of the N textures, except for the first texture, have been blended together. The N−2 masks can be extracted, for example, from an intensity texture, an RGB texture, or an RGBα texture. The first texture can be, for example, scaled or scaled and biased to form at least one of the N−2 masks.

In another embodiment of the invention, at least a first mask, a second mask, and a third mask are extracted from the first texture. The second texture is multiplied by the first mask to form a first image. A third texture is multiplied by the second mask to form a second image. A fourth texture is multiplied by the third mask to form a third image. At least the first image, the second image, and the third image are added to form the blended image. In an embodiment, the first mask and the second mask are added and the result unsigned-inverted to form the third mask.

In embodiments of the invention, the textures that are blended together each have a red color channel, a green color channel, and a blue color channel, and these color channels are uniformly blended to form the blended image. In other embodiments, the textures that are blended together each have a red color channel, a green color channel, and a blue color channel, and these color channels are non-uniformly blended to form the blended image.

In an embodiment, the present invention is used to blend between consecutive roaming levels in a cliptexture emulation scheme. It is an advantage of the invention that any texture can be used. It is also an advantage of the invention that embodiments can be implemented using the processing capabilities of available graphics processors.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

Figure 5A:
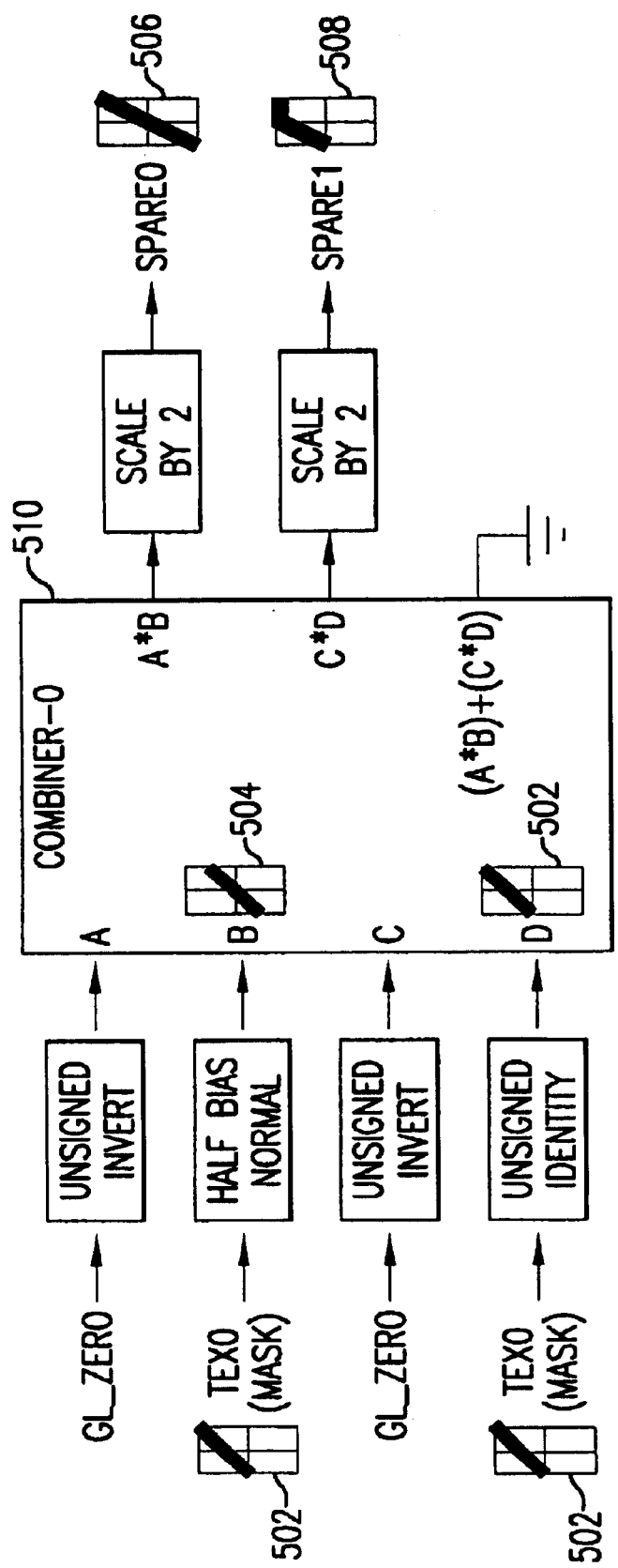
Figure 5B:
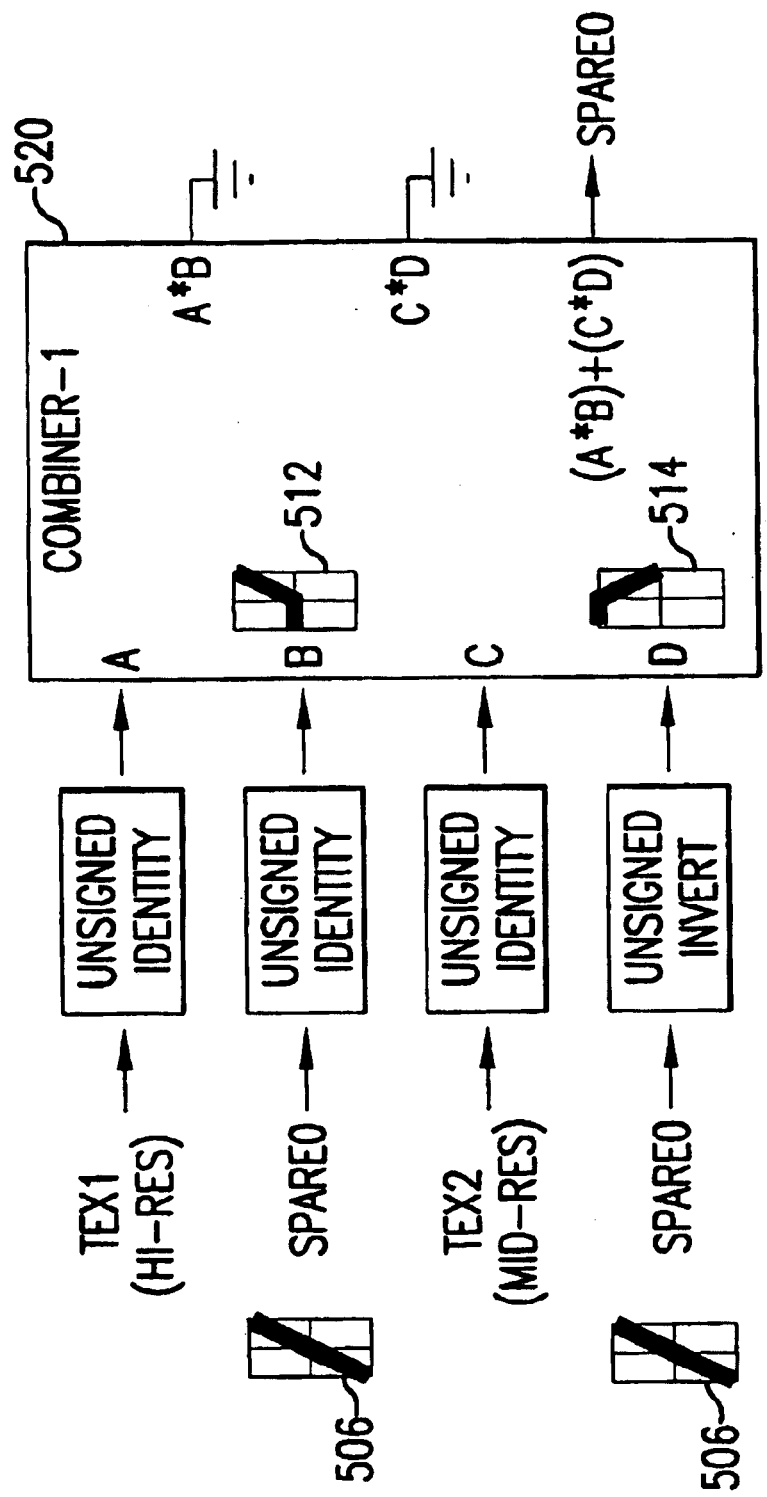
Figure 5C:
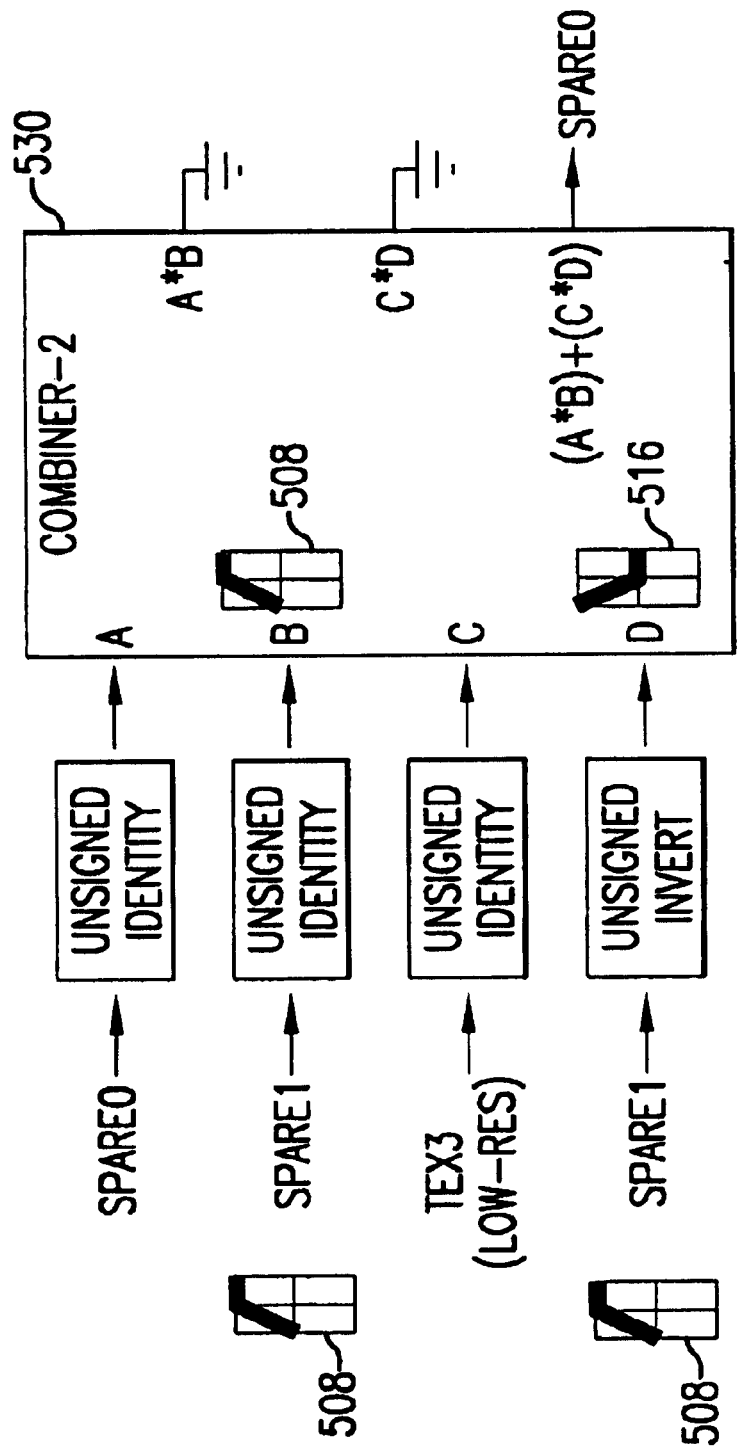

FIGS. 5A–C is a block diagram that illustrates how to implement an embodiment of the invention.

Figure 6A:
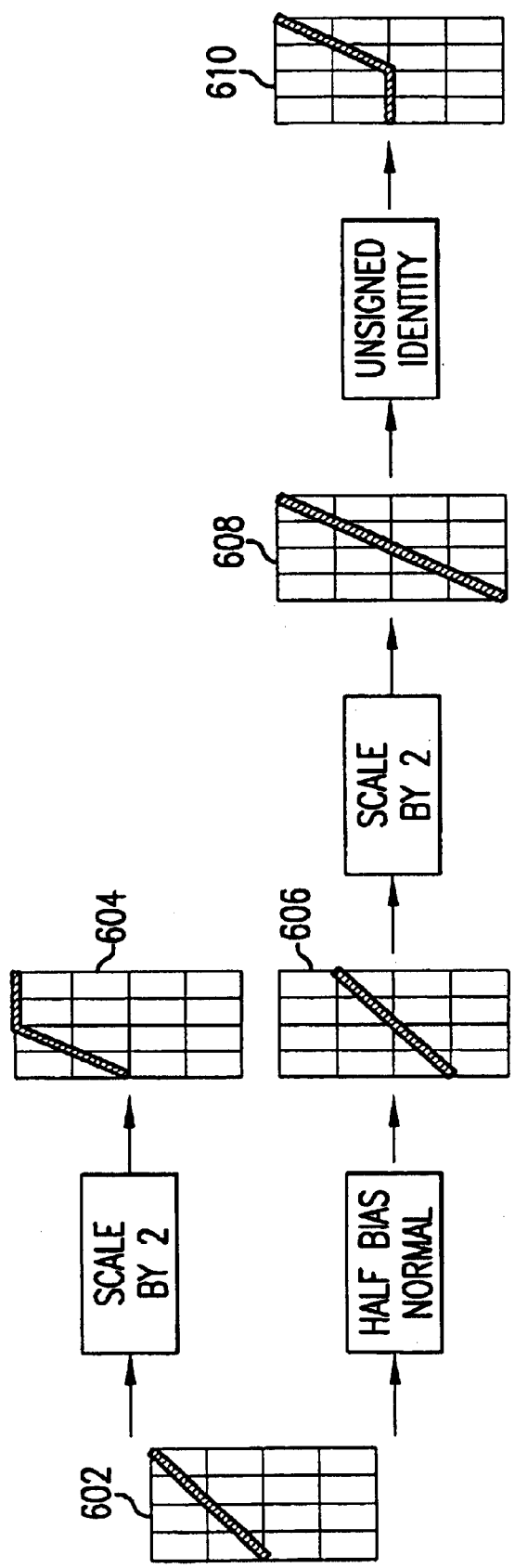
Figure 6B:
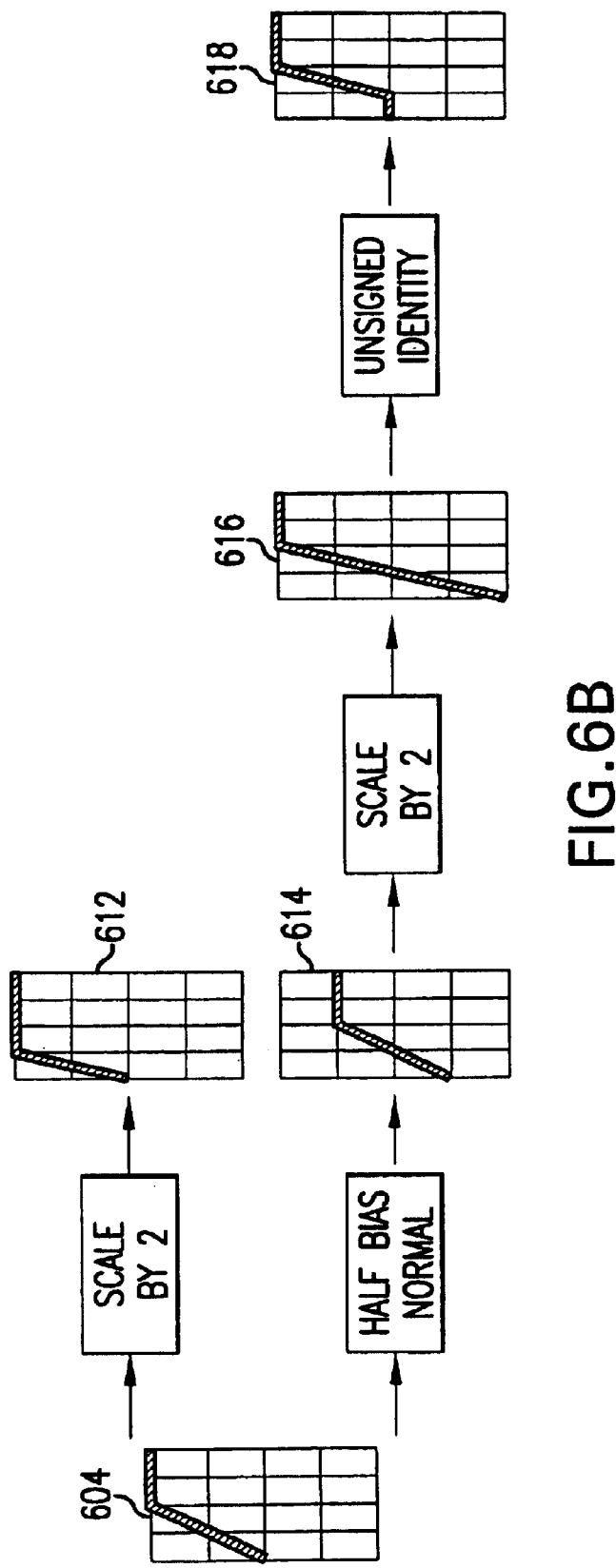

FIGS. 6A–C is a block diagram that illustrates how to implement an embodiment of the invention.

Figure 7A:
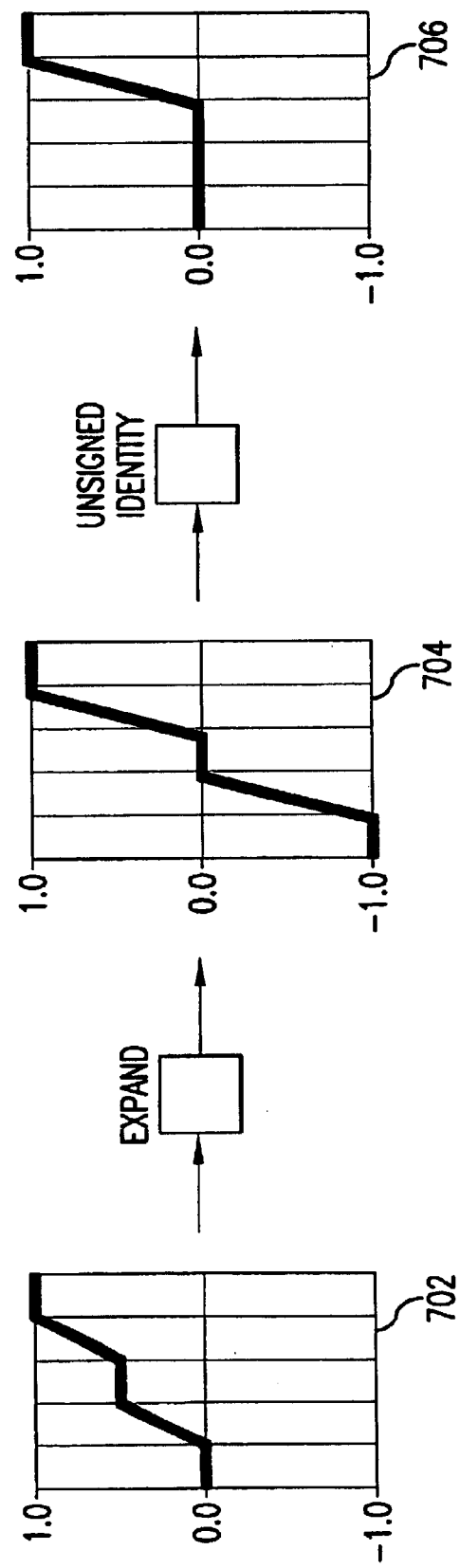
Figure 7B:
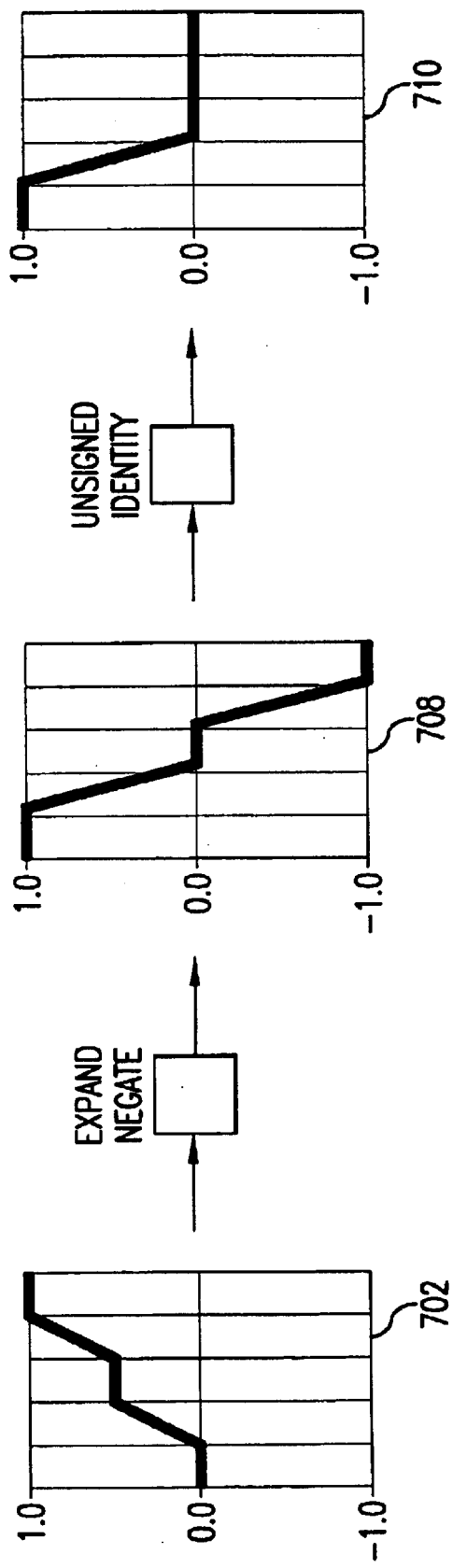
Figure 7C:
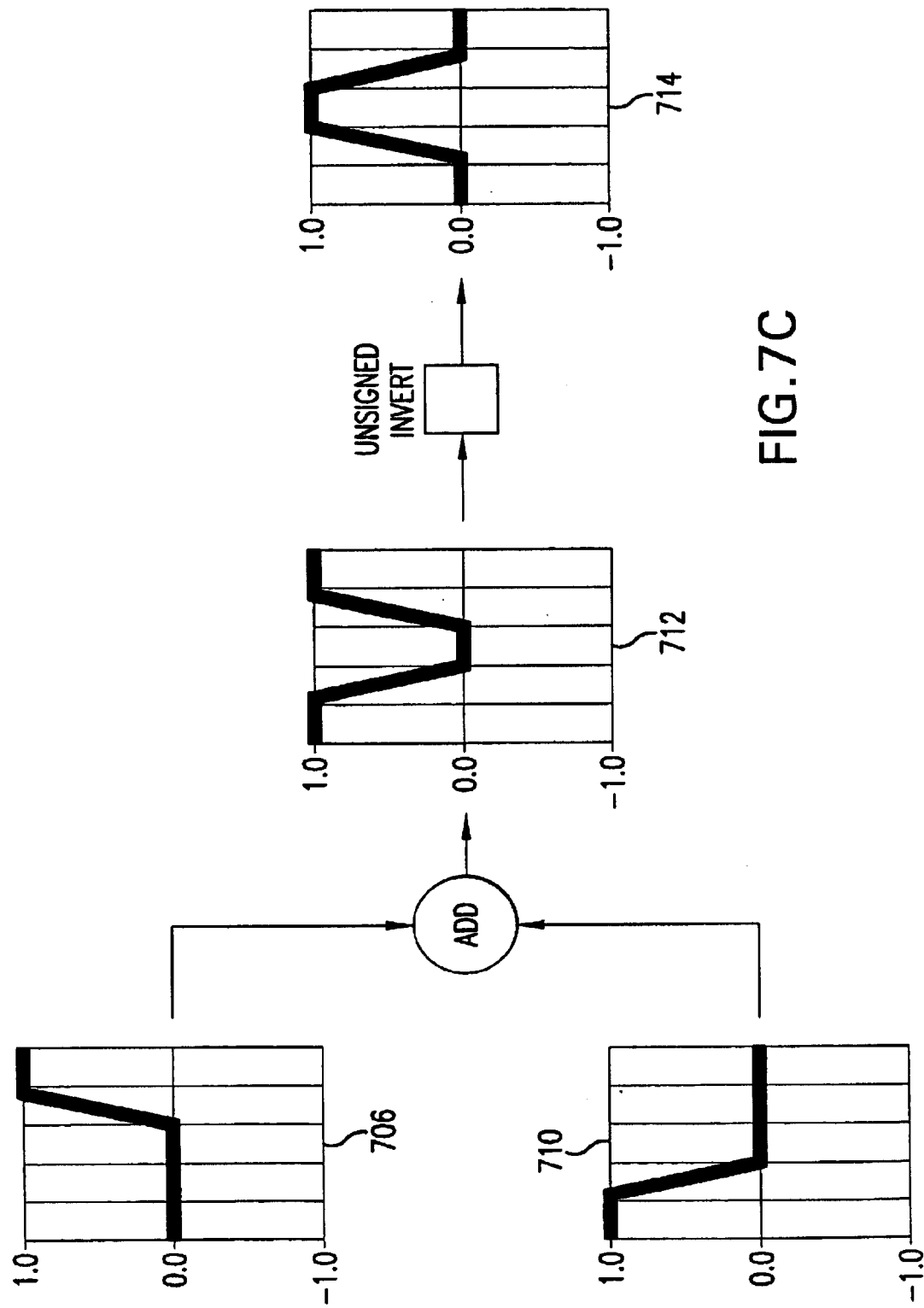

FIGS. 7A–C is a block diagram that illustrates how to implement an embodiment of the invention.

Figure 8:
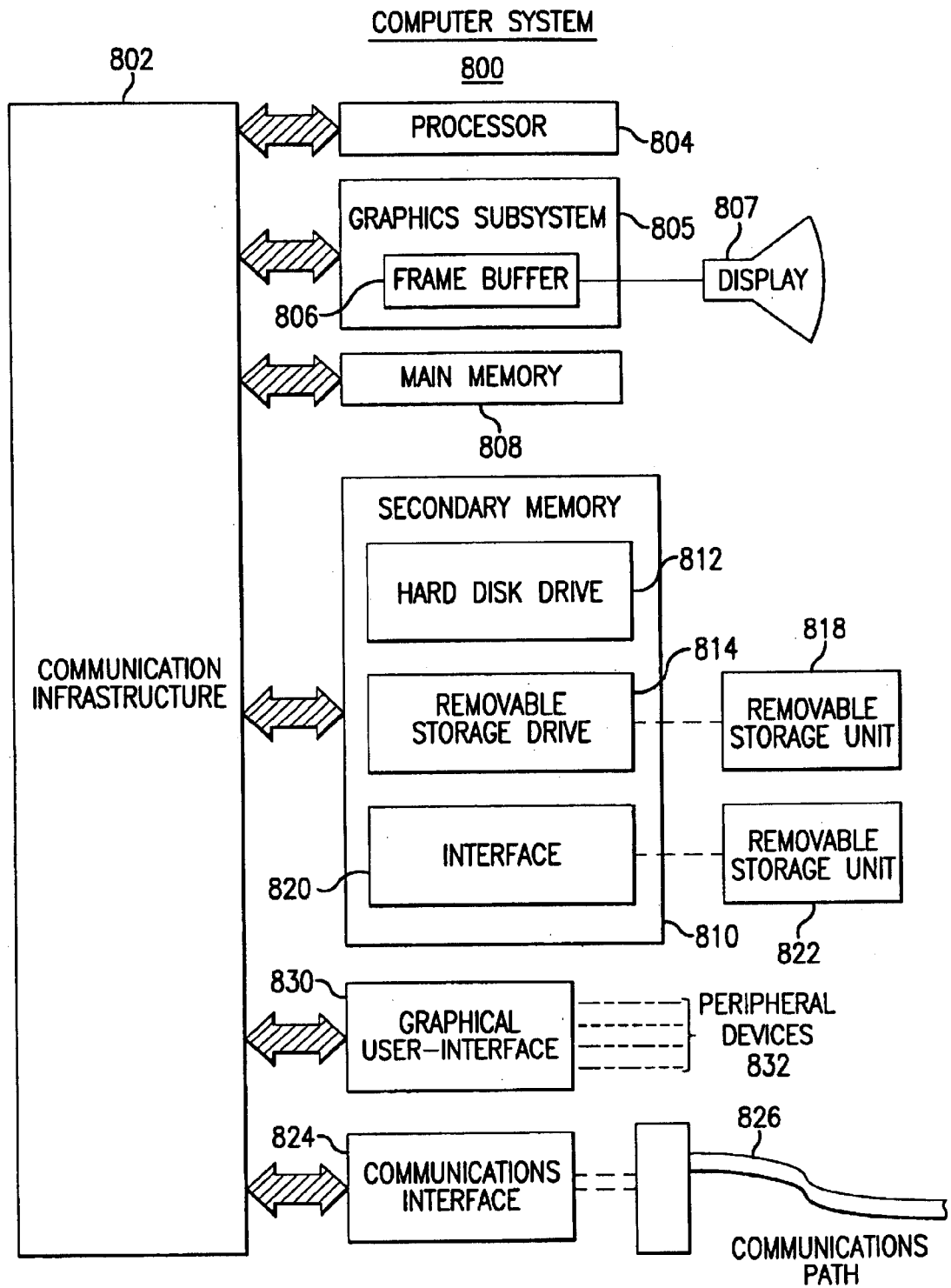

FIG. 8 illustrates an example computer system that can be used to implement the invention.

DETAILED DESCRIPTION OF THE INVENTION

As described herein, the present invention provides a method, a system, and a computer program product for blending a variable number of textures using a single texture as a mask. The detailed description of the present invention that follows begins with a terminology subsection that defines terms used to describe the invention. This subsection is followed by subsections that describe in detail various embodiments of the invention. Finally, this section concludes by describing a computer system that can be used to implement computer program product embodiments of the invention.

Terminology

The following terms are defined so that they may be used to describe embodiments of the present invention. As used herein:

"Cliptexture emulation scheme" means a texture paging scheme that emulates the functionality of hardware cliptexturing available on SGI INFINITEREALITY systems from SGI, Incorporated, Mountain View, Calif. This functionality supports, for example, displaying textures that are too large to fit in available graphics processor memory or system memory.

"Fragment" means an image point and its associated information such as color, depth, and texture data.

"Image" means an array of data values. A typical image might have red, green, blue, and/or alpha pixel data, or other types of pixel data information as known to a person skilled in the relevant art.

"Mask" or "Mask Texture" means an array of values used to blend between textures. Typically, values of a mask or mask texture are used as weighting factors associated with particular texels blended together to form a texel.

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30–60 frames/second. In some example embodiments, such as some flight simulators or some interactive computer games, an interactive rate may be approximately 10 frames/second. In some examples, real-time can be one update per second.

"Texture" means an array of texels. A texel can be a color or an intensity value. A texture can be any array of values that is used to determine a value for a pixel. As used herein, the term "texture" includes, for example, texture maps, bump maps, and gloss maps.

"Texel" means a texture element.

"Texture sample" means a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some instances obtain multiple texture samples from multiple textures.

Example Architecture of the Invention

Figure 1:
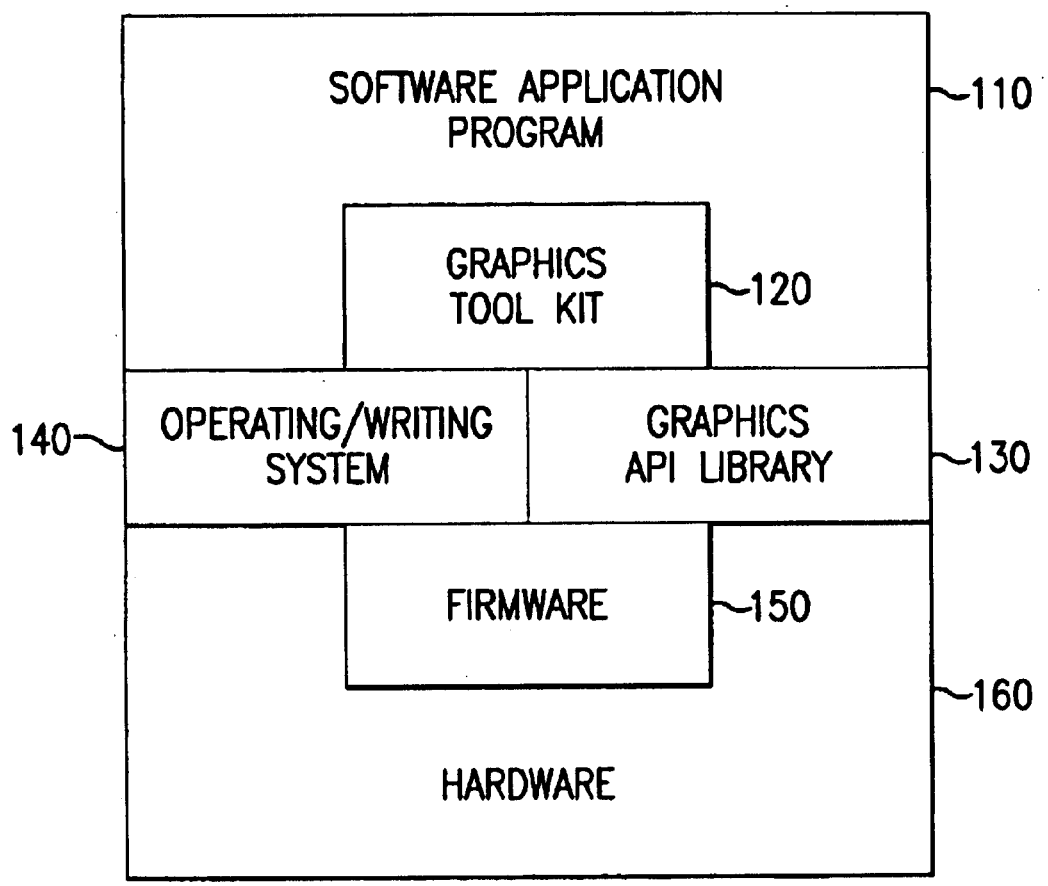
FIG. 1 illustrates an example architecture in which the invention can be implemented.

FIG. 1 illustrates a block diagram of an example computer architecture 100 in which the various features of the present invention can be implemented. It is an advantage of the invention that it may be implemented in many different ways, in many environments, and on many different computers or computer systems.

Architecture 100 includes six overlapping layers. Layer 110 represents a high level software application program. Layer 120 represents a three-dimensional (3D) graphics software tool kit, such as OPENGL PERFORMER. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in most commercially available computers.

As will be apparent to a person skilled in the relevant art after reading the description of the invention herein, various features of the invention can be implemented in any one of the layers 110–160 of architecture 100, or in any combination of layers 110–160 of architecture 100.

Example System Embodiment of the Present Invention

Figure 2:
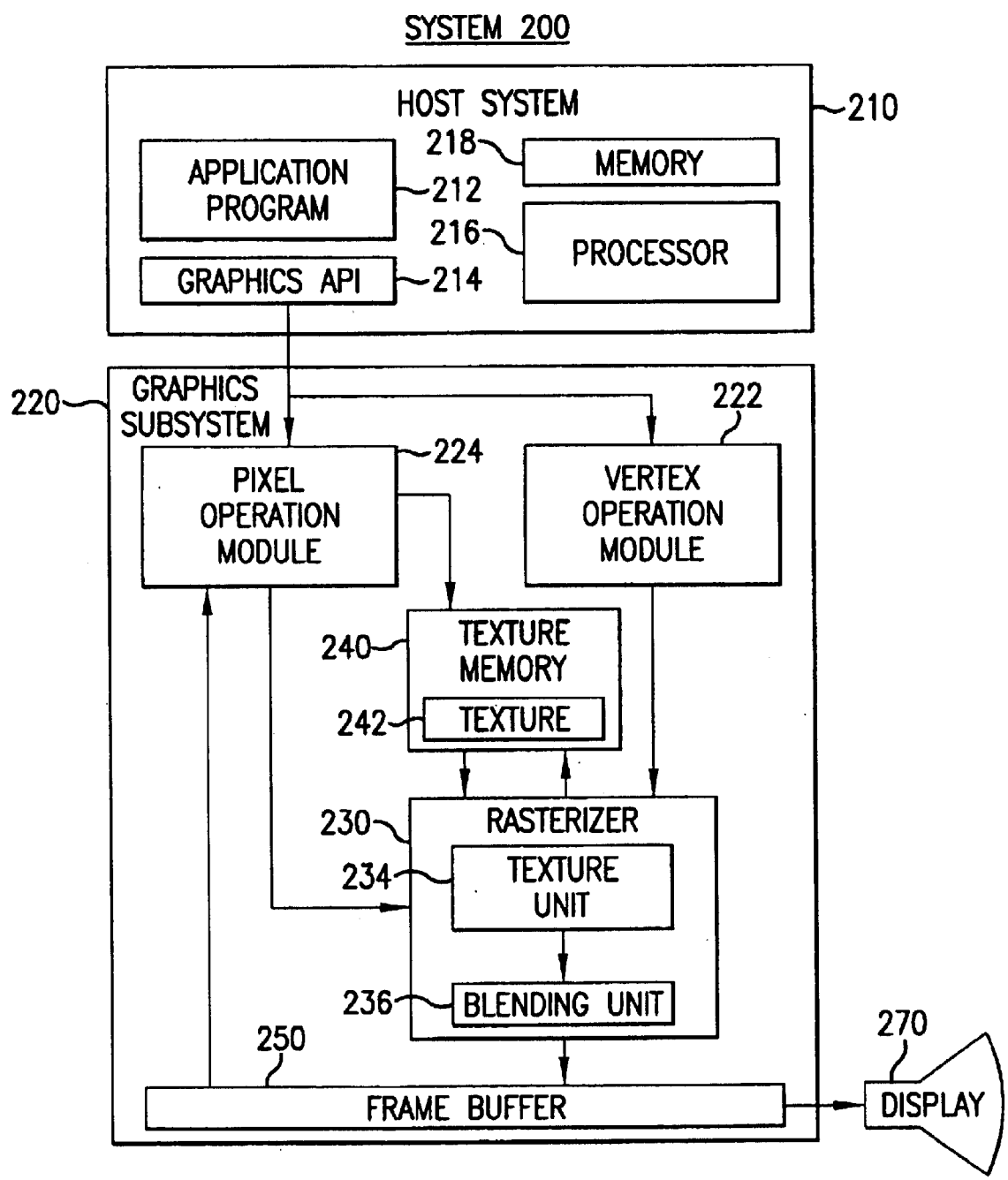
FIG. 2 illustrates an example system according to an embodiment of the invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a processor 216, and a memory 218. Application program 212 can be any program requiring the rendering of a computer image. The computer code of application program 212 is executed by processor 216. Application program 212 assesses the features of graphics subsystem 220 and display 270 through hardware interface or graphics API 214. Memory 218 stores information used by application program 212.

Graphics subsystem 220 comprises a vertex operation module 222, a pixel operation module 224, a rasterizer 230, a texture memory 240, and a frame buffer 250. Texture memory 240 can store one or more textures or images, such as texture 242. Texture memory 240 is connected to a texture unit 234 by a bus (not shown). Rasterizer 230 comprises a texture unit 234 and a blending unit 236. Texture unit 234 and blending unit 236 can be implemented separately or together as part of a graphics processor. The operation of these features of graphics system 200 would be known to a person skilled in the relevant art given the description herein.

In embodiments of the present invention, texture unit 234 can obtain multiple point samples or multiple filtered texture samples from textures and/or images stored in texture memory 240. Blending unit 236 blends texels and/or pixel values according to weighting values to produce a single texel or pixel. The output of texture unit 238 and/or blending unit 236 is stored in frame buffer 250. Display 270 can be used to display images stored in frame buffer 250.

The embodiment of the invention shown in FIG. 2 has a multipass graphics pipeline. It is capable of operating on each pixel of an image (object) during each pass that the image makes through the graphics pipeline. For each pixel of the image, during each pass that the image makes through the graphics pipeline, texture unit 234 can obtain at least one texture sample from the textures and/or images stored in texture memory 240. Although the embodiment of the invention shown in FIG. 2 has a multipass graphics pipeline, it is noted here that other embodiments of the invention do not have a multipass graphics pipeline. As described below, method embodiments of the invention can be implemented using systems that do not have a multipass graphics pipeline.

Example Method Embodiments of the Present Invention

Figure 3A:
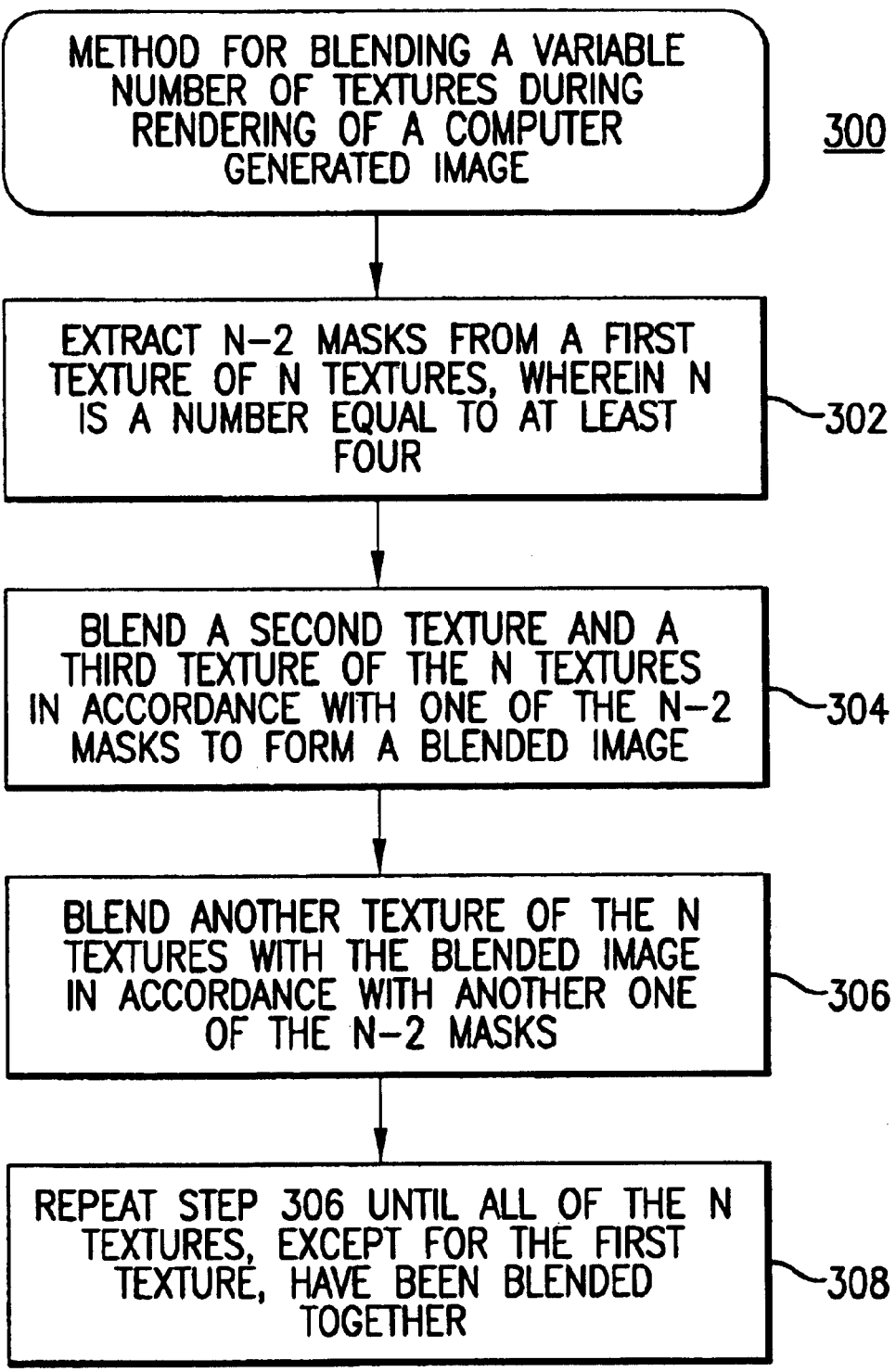
FIG. 3A is a flowchart of the steps of a method according to an embodiment of the invention.

FIG. 3A illustrates a flowchart of the steps of a method 300 for blending a variable number of textures during rendering of a computer generated image according to an embodiment of the invention. As described herein, method 300 has four steps 302, 304, 306, and 308. These steps can be implemented during a single pass through a graphics rendering pipeline. Method 300 can be implemented using system embodiments of the present invention (e.g., system 200). The steps of method 300 will now be described.

In step 302, N−2 masks are extracted from a first texture of N textures, wherein N is a number equal to at least four. These N−2 masks can be extracted, for example, from an intensity (single component) texture, a red-green-blue (RGB) texture, or an RGBα texture. As described in more detail below, a mask can be extracted, for example, by scaling the values of the first texture or by scaling and biasing the values of the first texture. In general, any number of masks can be extracted from the first texture by scaling and biasing the values of the first texture. As described herein, there are no requirements regarding the first texture. Masks can be extracted from any texture in accordance with the invention.

In step 304, a second texture and a third texture of the N textures are blended in accordance with one of the N−2 masks to form a blended image. In one embodiment, fragment values from one of the N−2 masks are used as weights in the blending of fragment values from the second texture and the third texture. For example, a fragment value (x) from the first texture can be used to form two weighting values (x) and (1−x) that are used to weight the fragment values obtained from the second texture and the third texture. The weighted fragment values of the second texture and the third texture are added to form the fragment values of the blended image.

In an embodiment, the second texture and the third texture each have a red color channel, a green color channel, and a blue color channel. In applications such as, for example, computer gaming applications, uniform color blending is desired. Thus, these color channels of the second texture and the third texture are uniformly blended to form the blended image (e.g., the same weighting value is applied to each color channel). Using a single component mask texture results in uniform blending. In other applications, however, such as diagnostic medical imaging, non-uniform blending may be desirable and useful. Thus, in some embodiments, the color channels of the second texture and the third texture are non-uniformly blended to form the blended image (e.g., different weighting values are applied to each color channel). An RGB mask texture can be used to obtain non-uniform blending. In some embodiments, the second texture and the third texture are intensity (single component) textures.

In step 306, another texture of the N textures is blended with the blended image in accordance with another one of the N−2 masks. This step is similar to step 304. In an embodiment, fragment values from another one of the N−2 masks are used as weights in the blending of fragment values from the blended image and fragment values from the texture of the N textures.

In step 308, step 306 is repeated until all of the N textures, except for the first texture, have been blended together. If N equals four, step 306 is not repeated. If N equals five, step 306 is repeated once. In general, step 306 is repeated N−4 times.

Figure 3B:
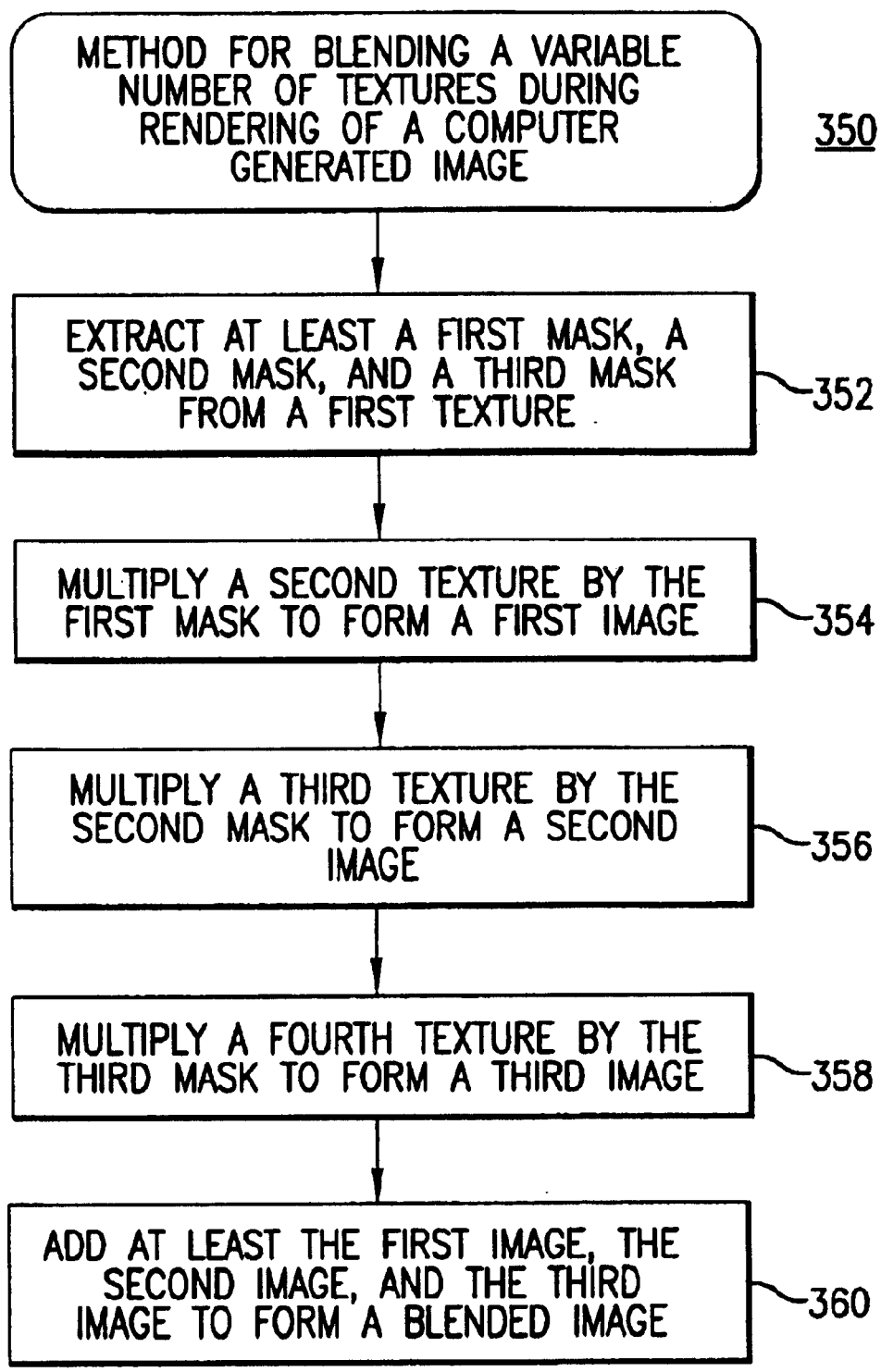
FIG. 3B is a flowchart of the steps of a second method according to an embodiment of the invention.

FIG. 3B illustrates another method 350 for blending a variable number of textures during rendering of a computer generated image according to an embodiment of the invention. As described herein, method 350 has five steps 352, 354, 356, 358, and 360. These steps can be implemented during a single pass through a graphics rendering pipeline. Method 350 can also be implemented using system embodiments of the present invention (e.g., system 200). The steps of method 350 will now be described.

In step 352, at least a first mask, a second mask, and a third mask are extracted from a first texture. In an embodiment, one or more masks are formed by expanding and clipping the values of the first texture. Other operations may also be used to extract the masks. In one embodiment, the third mask is formed by adding the first mask to the second mask and unsigned-inverting the result. Since, in embodiments, the sum of the three masks is always 1.0, the third mask can be formed by subtracting the value of the first mask and the value of the second mask from the value 1.0. Masks can be extracted from any texture in accordance with the invention.

In step 354, a second texture is multiplied by the first mask to form a first image. In an embodiment, the second texture has a red color channel, a green color channel, and a blue color channel. In applications such as, for example, computer gaming applications, these color channels of the second texture are uniformly weighted to form the first image (e.g., the same weighting value is applied to each color channel). In other applications, however, the color channels of the second texture are non-uniformly weighted to form the first image (e.g., different weighting values are applied to each color channel). In other embodiments, the second texture is an intensity texture.

In step 356, a third texture is multiplied by the second mask to form a second image. This step is similar to step 354.

In step 358, a fourth texture is multiplied by the third mask to form a third image. This step is also similar to step 354.

In step 360, at least the first image, the second image, and the third image are added to form a blended image. This blended image is similar to the blended image formed by method 300.

In an embodiment, the invention (e.g., method 300 or method 350) is used to blend multiple roaming levels in a cliptexture emulation scheme. These roaming levels may be consecutive roaming levels or non-consecutive roaming levels. As will be understood by a person skilled in the relevant art given the description herein, two consecutive roaming level textures comprise two independent textures of equal size representing two concentric subregions of a larger (virtual) image. One of the two roaming level textures covers four times the area covered by the other roaming level texture, but at one-fourth the resolution.

In an embodiment, the invention is used to blend multiple textures in a dynamic texture paging scheme. The textures that are blended according to this embodiment provide coverage for different areas of a larger (virtual) image at potentially different resolutions. In an embodiment, the blended textures cover overlapping areas of a larger (virtual) image.

The invention enables the correct rendering of geometry that is not completely covered by any single texture. This is accomplished by encoding the relative positions of the areas of multiple textures in a mask texture.

Figure 4:
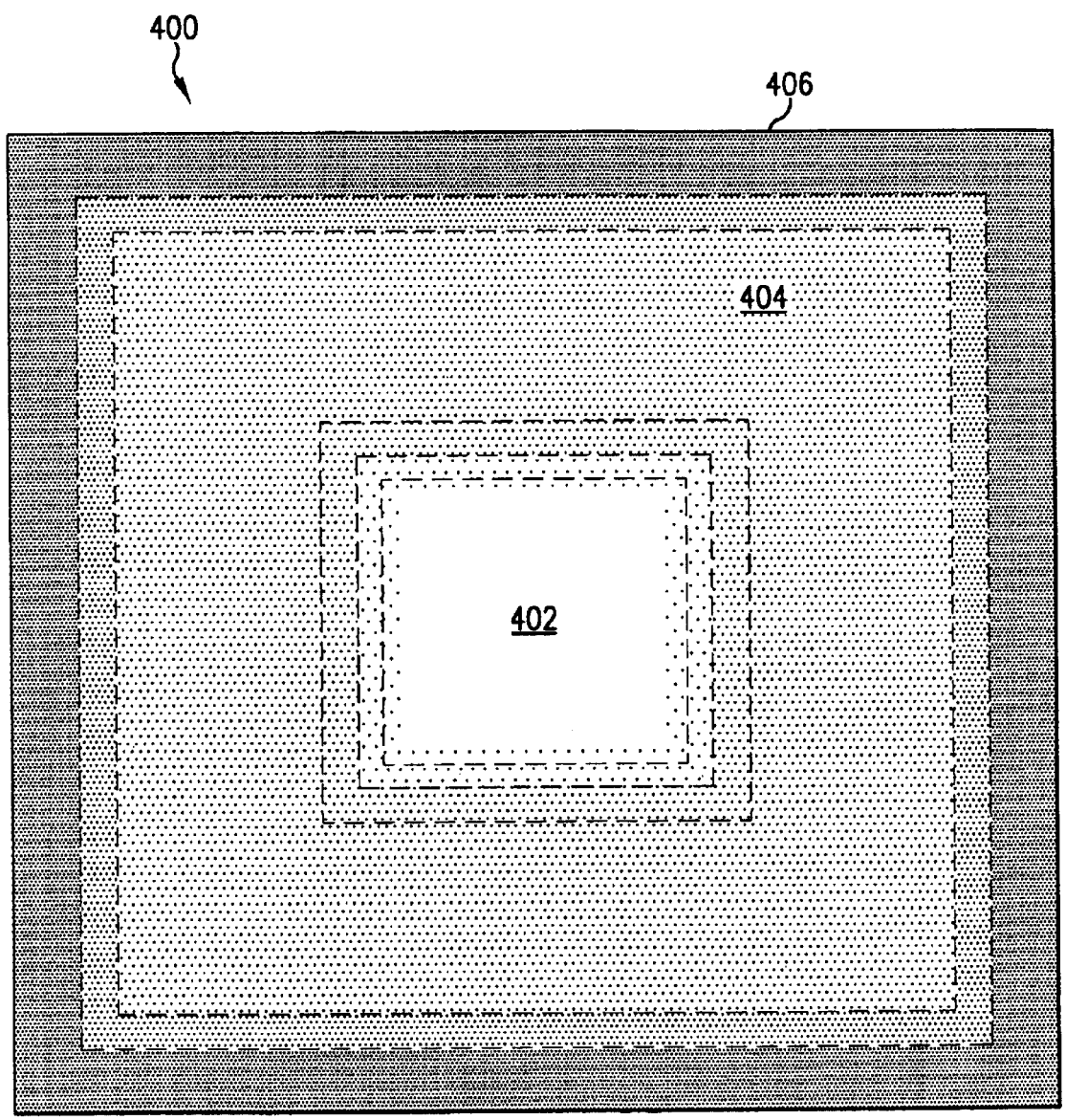
FIG. 4 illustrates a texture used to blend between consecutive roaming levels in a cliptexture emulation scheme according to an embodiment of the invention.

FIG. 4 illustrates an example texture 400 according to an embodiment of the invention that can be used to blend consecutive roaming level textures in a cliptexture emulation scheme. As shown in FIG. 4, texture 400 has a white square region 402, a gray square region 404, and a black square region 406. The values in white square region 402 are equal to 1.0. The values in the gray square region 404 are equal to 0.5. The values in the black square region are equal to 0.0. The region between white square region 402 and gray square region 404 contains values between 1.0 and 0.5. The region between gray square region 404 and black square region 406 contains values between 0.5 and 0.0.

In an embodiment, the values of texture 400 are extracted and used to form masks. These masks are used, for example, to blend between any three consecutive roaming level textures (e.g., a high resolution texture, a medium resolution texture, and a low resolution texture) and form a blended image. A texel value of 1.0 in texture 400 indicates that a fragment value from the high resolution texture is used to form the blended image. A texel value between 1.0 and 0.5 indicates that a linear blend between the high resolution texture and the medium resolution texture is used. A texel value of 0.5 indicates that a fragment value from the medium resolution texture is used to form the blended image. A texel value between 0.5 and 0.0 indicates that a linear blend between the medium resolution texture and the low resolution texture is used. Finally, a texel value of 0.0 indicates that a fragment value from the low resolution texture is used to form the blended image. In an embodiment, the high resolution texture and the medium resolution texture have no MIPMAP levels while the low resolution texture may have MIPMAPs.

Texture 400 is only illustrative, and it is not intended to limit the invention. Other textures according to the invention have non-square regions and more or fewer regions than that of texture 400. In embodiments, textures having a photographic image (where no area is clearly identifiable) are used as mask textures in accordance with the invention.

FIGS. 5A–C illustrate schematically how to implement method 300 of the invention using an available graphics processor such as the NVIDIA GEFORCE3. The NVIDIA GEFORCE3 graphics processor has a feature known as register combiners for computing fragment colors. The register combiners of the NVIDIA GEFORCE3 graphics processor support up to four simultaneous texture lookups.

A person skilled in the relevant art given the description herein will understand how to use the register combiners feature of the NVIDIA GEFORCE3 graphics processor to implement method 300. Method 300 is not limited, however, to being implemented using the NVIDIA GEFORCE3 graphics processor.

FIG. 5A illustrates how to extract a mask 506 and a mask 508 from a texture 502 using a combiner 510 (i.e., combiner-0). See step 302 of method 300. Texture 502 has values ranging from 0.0 to 1.0. Combiner 510 has four inputs (A, B, C, and D) and three outputs. As shown in FIG. 5A, the three outputs are set to (A*B), (C*D), and ( (A*B)+(C*D)).

A constant value (GL_ZERO) is operated on by an unsigned invert operation and provided to input A of combiner 510. Texture 502 is also operated on by a half bias normal operation and provided to input B of combiner 510 to form a mask 504. The output (A*B) of combiner 510 is scaled by two to form the mask 506. Mask 506 is stored in a memory (spare0).

The constant value (GL_ZERO) is also operated on by an unsigned invert operation and provided to input C of combiner 510. Texture 502 is operated on by an unsigned identity operation and provided to input D of combiner 510. The output (C*D) of combiner 510 is scaled by two to form the mask 508. Mask 508 is stored in a memory (spare1).

FIG. 5B illustrates how to blend between two textures using mask 506 to form a blended image. See step 304 of method 300.

As illustrated in FIG. 5B, a high resolution texture (Tex1) is operated on by an unsigned identity operation and provided to input A of a combiner 520 (i.e., combiner-1). Mask 506 is operated on by an unsigned identity operation and provided to input B of combiner 520 to form a mask 512. A medium resolution texture (Tex2) is operated on by an unsigned identity operation and provided to input C of combiner 520. Mask 506 is also operated on by an unsigned invert operation and provided to input D of combiner 520 to form a mask 514. The output ((A*B)+(C*D)) of combiner 520 is the desired blended image. This blended image is stored in memory (spare0).

FIG. 5C illustrates how to blend between the blended imaged (i.e., the blended image stored in memory) and another texture using mask 508. See step 306 of method 300.

As illustrated in FIG. 5C, the blended image stored in memory (spare0) is operated on by an unsigned identity operation and provided to input A of a combiner 530 (i.e., combiner-2). Mask 508 is operated on by an unsigned identity operation and provided to input B of combiner 530. A low resolution texture (Tex3) is operated on by an unsigned identity operation and provided to input C of combiner 530. Mask 508 is also operated on by an unsigned invert operation and provided to input D of combiner 530 to form a mask 516. The output ((A*B)+(C*D)) of combiner 530 is the desired blended image. This image is stored in memory (spare0).

Operations similar to those shown in FIGS. 5A–C can be performed using additional masks and additional textures in order to blend together more than three textures. See step 308 of method 300. More than three total pixel shader stages of the type illustrated in FIGS. 5A–C will be available for carrying out these operations.

The invention can be implemented on other available graphics processors in a manner similar to that described herein with regards to FIGS. 5A–C. As will become apparent to a person skilled in the relevant art given the description herein, the number of textures that can be blended in a single pass through a graphics rendering pipeline is dependent on the number of available total pixel shader stages. In general, the number of textures that can be blended using a single texture as a mask is N−1, where N is the total number of textures that can be rendered simultaneously.

FIGS. 6A–C illustrate another example embodiment of the invention. In this example embodiment, four masks 604, 610, 618, and 626 are extracted from a single texture 602. In an embodiment, the process of extracting masks is an iterative process in which two masks are extracted from a single mask texture, and then additional masks are extracted from one or more of the extracted masks (i.e., the extracted masks are treated the same as the original mask texture and used to create additional masks). Using this iterative process, two masks can be extracted from one mask, four masks can be extracted from two masks, and eight masks can be extracted from four masks, et cetera. A non-power-of-two number of masks can be extracted, for example, by extracting two masks (A and B) and then splitting one of the masks (e.g., A) into two masks (C and D) to form a total of three compatible masks (B, C, and D).

The following embodiment of the invention shown in FIGS. 6A–C further illustrates how multiple masks can be extracted from a single texture in accordance with method 300 of the invention.

FIG. 6A illustrates how to extract mask 604 and mask 610. Mask 604 is extracted from texture 602 by scaling texture 602 by two. Mask 610 is extracted from texture 602 by performing a half bias normal operation on texture 602 to form a texture 606. Texture 606 is scaled by two to form a texture 608. An unsigned identity operation is then performed on texture 608 to form mask 610.

FIG. 6B illustrates how to extract mask 618. Mask 618 is extracted from texture 604 by performing a half bias normal operation on texture 604 to form a texture 614. Texture 614 is scaled by two to form a texture 616. An unsigned identity operation is then performed on texture 616 to form mask 618. As shown in FIG. 6B, a texture 612 can be formed from texture 604 by scaling texture 604 by two. Texture 612 can also be used to form a mask in a manner similar to the way mask 618 is formed from texture 604. The operations used to split mask 604 into two masks 612 and 618 are the same as those carried out to obtain the masks 604 and 610 from the mask texture 602.

FIG. 6C illustrates how to extract mask 626. Mask 626 is extracted from texture 610 by performing a half bias normal operation on texture 610 to form a texture 622. Texture 622 is scaled by two to form a texture 624. An unsigned identity operation is then performed on texture 624 to form mask 626. As shown in FIG. 6C, a texture 620 can be formed from texture 610 by scaling texture 610 by two. These operations are the same as those carried out in FIGS. 6A and 6B. It should be noted that texture 620 can also be used to form a mask.

FIGS. 7A–C illustrate how to implement method 350 of the invention. FIGS. 7A–C are illustrative only and are not intended to limit the invention. Each step of method 350 can be implemented using an available graphics processor such as the NVIDIA GEFORCE3, in a manner similar to that shown in FIGS. 5A–C.

In the example illustrated in FIGS. 7A–C, three masks 706, 710, and 714 are extracted from a texture 702. See step 352 of method 350. Texture 702 is a schematic illustration of texture 400, shown in FIG. 4.

FIG. 7A illustrates how the mask 706 is extracted from texture 702. First, the values of texture 702 are expanded so that they range between −1.0 and 1.0 rather than 0.0 and 1.0. This is shown in a mask 704. Next, the values of mask 704 are operated on using an unsigned identity operation to form mask 706. The unsigned identity operation clips values at 0.0, as shown in mask 706.

Mask 706 can be thought of as a high resolution mask. A high resolution texture is multiplied by mask 706 to form a first image. See step 354 of method 350.

FIG. 7B illustrates how a mask 710 is formed from texture 702. First, the values of texture 702 are expanded and negated so that they range between 1.0 and −1.0 rather than 0.0 and 1.0. This is shown in a mask 708. Next, the values of mask 708 are operated on using an unsigned identity operation to form mask 710. The unsigned identity operation clips values at 0.0, as shown in mask 710.

Mask 710 can be thought of as a low resolution mask. A low resolution texture is multiplied by mask 710 to form a second image. See step 356 of method 350.

FIG. 7C illustrates how the mask 714 is formed from masks 706 and 710. First, the values of mask 706 and 710 are added to form a mask 712. Next, the values of mask 712 are operated on using an unsigned invert operation to form mask 714.

Mask 714 can be though of as a medium resolution mask. A medium resolution texture is multiplied by mask 714 to form a third image. See step 358 of method 350.

As will become apparent to a person skilled in the relevant art given the description herein, a blended image can be formed by adding together the first image, the second image, and the third image. See step 360 of method 350.

As described herein, the invention is very flexible, and further features and advantages of the present invention will become apparent to a person skilled in the relevant art given the description of the invention herein.

Example Computer System for Implementing Computer Program Product Embodiments of the Invention FIG. 8 illustrates an example of a computer system 800 that can be used to implement computer program product embodiments of the present invention. This example computer system is illustrative and not intended to limit the present invention. Computer system 800 represents any single or multi-processor computer. Single-threaded and multi-threaded computers can be used. Unified or distributed memory systems can be used.

Computer system 800 includes one or more processors, such as processor 804, and one or more graphics subsystems, such as graphics subsystem 805. One or more processors 804 and one or more graphics subsystems 805 can execute software and implement all or part of the features of the present invention described herein. Graphics subsystem 805 can be implemented, for example, on a single chip as a part of processor 804, or it can be implemented on one or more separate chips located on a graphic board. Each processor 804 is connected to a communication infrastructure 802 (e.g., a communications bus, cross-bar, or network). After reading this description, it will become apparent to a person skilled in the relevant art how to implement the invention using other computer systems and/or computer architectures.

Computer system 800 also includes a main memory 808, preferably random access memory (RAM), and can also include secondary memory 810. Secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

In an embodiment, computer system 800 includes a frame buffer 806 and a display 807. Frame buffer 806 is in electrical communication with graphics subsystem 805. Images stored in frame buffer 806 can be viewed using display 807. Many of the features of the invention described herein are performed within the graphics subsystem 805.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network such as the Internet.

Computer system 800 can include one or more peripheral devices 832, which are coupled to communications infrastructure 802 by graphical user-interface 830. Example peripheral devices 832, which can from a part of computer system 800, include, for example, a keyboard, a pointing device (e.g., a mouse), a joy stick, and a game pad. Other peripheral devices 832, which can form a part of computer system 800 will be known to a person skilled in the relevant art given the description herein.

The present invention can be implemented using software running (that is, executing) in an environment similar to that described above with respect to FIG. 7. In this document, the term "computer program product" is used to generally refer to removable storage unit 818, a hard disk installed in hard disk drive 812, or a carrier wave or other signal carrying software over a communication path 826 (wireless link or cable) to communication interface 824. A computer useable medium can include magnetic media, optical media, or other recordable media, or media that transmits a carrier wave. These computer program products are means for providing software to computer system 800.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. Alternatively, the computer program product may be downloaded to computer system 800 over communications path 826. The control logic (software), when executed by the one or more processors 804, causes the processor(s) 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

CONCLUSION

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for blending a variable number of textures during rendering of a computer generated image, the method comprising the steps of:

(1) extracting at least a first mask and a second mask from a first texture by applying scale and bias operations to the first texture;

(2) blending a second texture and a third texture in accordance with the first mask to form a first image; and (3) blending the first image and a fourth texture in accordance with the second mask to form a second image.

2. The method of claim 1, wherein step (1) further comprises:

extracting the first mask and the second mask from an intensity texture.

3. The method of claim 1, wherein step (1) further comprises:

extracting the first mask and the second mask from an RGB texture.

4. The method of claim 1, wherein step (1) further comprises:

extracting the first mask and the second mask from an RGB-Alpha texture.

5. The method of claim 1, wherein the second texture and the third texture each have a red color channel, a green color channel, and a blue color channel, and step (2) further comprises:

uniformly blending the red color channel, the green color channel, and the blue color channel of the second texture and the third texture to form the first image.

6. The method of claim 1, wherein the second texture and the third texture each have a red color channel, a green color channel, and a blue color channel, and step (2) further comprises:

non-uniformly blending the red color channel, the green color channel, and the blue color channel of the second texture and the third texture to form the first image.

7. A system for blending a variable number of textures during rendering of a computer generated image, comprising:

means for extracting at least a first mask and a second mask from a first texture by applying scale and bias operations to the first texture;

means for blending a second texture and a third texture in accordance with the first mask to form a first image; and means for blending the first image and a fourth texture in accordance with the second mask to form a second image.

8. The system of claim 7, further comprising:

means for scaling the first texture to form the first mask.

9. The system of claim 7, further comprising:

means for scaling and biasing the first texture to form the first mask.

10. A computer program product for blending a variable number of textures during rendering of a computer generated image, said computer program product comprising a computer useable medium having computer program logic recorded thereon for controlling a processor, said computer program logic comprising:

a procedure that extracts at least a first mask and a second mask from a first texture by applying scale and bias operations to the first texture;

a procedure that blends a second texture and a third texture in accordance with the first mask to form a first image; and a procedure that blend the first image and a fourth texture in accordance with the second mask to form a second image.

11. The computer program product of claim 10, further comprising:

a procedure that scales the first texture to form the first mask.

12. The computer program product of claim 10, further comprising:

a procedure that scales and biases the first texture to form the first mask.

13. A method for blending a variable number of textures during rendering of a computer generated image, the method comprising the steps of:

(1) extracting N−2 masks from a first texture of N textures, wherein N is a number equal to at least four;

(2) blending a second texture and a third texture of the N textures in accordance with one of the N−2 masks to form a blended image;

(3) blending another texture of the N textures with the blended image in accordance with another one of the N−2 masks; and (4) repeating step (3) until all of the N textures, except for the first texture, have been blended together.

14. The method of claim 13, wherein step (1) further comprises:

scaling the first texture to form one of the N−2 masks.

15. The method of claim 13, wherein step (1) further comprises:

scaling and biasing the first texture to form one of the N−2 masks.

16. The method of claim 13, wherein step (1) further comprises:

extracting the N−2 masks from an intensity texture.

* * * * *